United States Patent
Cook et al.

(10) Patent No.: US 7,411,905 B1
(45) Date of Patent: Aug. 12, 2008

(54) SEGMENTED IP BACKBONE NETWORK ACCESS

(75) Inventors: Fred S. Cook, Olathe, KS (US); John K. Dixon, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 782 days.

(21) Appl. No.: 10/657,024

(22) Filed: Sep. 5, 2003

(51) Int. Cl.
*H04L 12/26* (2006.01)
(52) U.S. Cl. .................................. 370/230; 370/252
(58) Field of Classification Search ............ 370/230, 370/230.1, 231, 338, 468, 395.21, 232, 235, 370/395.42, 395.43, 229, 233, 234, 252, 370/253, 412
See application file for complete search history.

(56) References Cited

U.S. PATENT DOCUMENTS

| | | | |
|---|---|---|---|
| 6,144,637 A | | 11/2000 | Calvignac et al. |
| 6,226,277 B1 * | | 5/2001 | Chuah ........................ 370/328 |
| 6,327,246 B1 | | 12/2001 | Jones |
| 6,442,136 B1 | | 8/2002 | Sugama et al. |
| 6,763,000 B1 * | | 7/2004 | Walsh ........................ 370/252 |
| 6,973,033 B1 * | | 12/2005 | Chiu et al. ............... 370/230.1 |
| 6,999,759 B2 * | | 2/2006 | Harris et al. ................. 455/418 |
| 7,257,098 B2 * | | 8/2007 | Sato et al. .................... 370/329 |
| 2002/0141355 A1 * | | 10/2002 | Struhsaker et al. .......... 370/280 |
| 2003/0123388 A1 * | | 7/2003 | Bradd ........................ 370/230 |
| 2004/0218604 A1 * | | 11/2004 | Porter ..................... 370/395.2 |
| 2006/0227706 A1 * | | 10/2006 | Burst, Jr. .................... 370/229 |

OTHER PUBLICATIONS

Zvolve, White Paper: Next Generation Traffic Engineering [online], Retrieved from the internet on Dec. 16, 2002, http://www.zvolve.com/.
Signaling System 7 (SS7) Gateway Solution for Internet Access, prepared by The Internationl Engineering Consorium [online], Retrieved from the internet on Dec. 16, 2002, http://www.iec.org/.
Tutorial: Interworking Switched Circuit and Voice-Over-IP Networks [online], Retrieved from the internet on Dec. 16, 2002, http://www.pt.com/tutorials/iptelephony/.
VoP Tutorial [online], Retrieved from the internet on Dec. 17, 2002, http://www.wave-report.com/turorials.VoP.htm.

* cited by examiner

*Primary Examiner*—Ricky Ngo
*Assistant Examiner*—Gary Mui

(57) ABSTRACT

A method for managing the transmission of messages over a backbone network in which the users are segmented relative to expected quality of service level. The access of the lesser service level users to the backbone network is then restricted, when necessary, to assure high quality or service for the other service level users. The other service customers are charged at a higher rate that reflects the better quality of service being provided to them.

17 Claims, 4 Drawing Sheets

SEGMENTED IP BACKBONE NETWORK ACCESS

BACKGROUND OF INVENTION

This invention relates in general to data transmission networks and in particular to a method for controlling the loading of internet protocol transmission networks.

Telephone systems have become increasingly sophisticated and are designed to provide many services to subscribers. A typical conventional telephone network 10, also referred to as a switched circuit network, is schematically illustrated in FIG. 1 where the arrows indicate the flow of information within the network. The network 10 has been simplified to illustrate its operation. An individual subscriber telephone 12 is connected to a Local Telephone Company, or Local Exchange Carrier (LEC) 13 by a Service Switching Point (SSP) 14. While one telephone 12 is shown in FIG. 1, it will be appreciated that a plurality of telephones and/or other devices, such as personal computers also may be connected from the subscriber to the SSP 14.

The SSP 14 provides a gateway for connection to long distance carriers, wireless networks and other local telephone companies which are collectively shown in FIG. 1 as a Public Switched Telephone Network (PSTN) 16. The SSP 14 is also connected through a Signaling Transfer Point (STP) 17 to a Service Control Point (SCP) 18. The STP 17 functions as a signal router while the SCP 18 includes a data base and operating instructions for the SSP 14. As shown by the double headed arrows in FIG. 1, information flows in both directions between the individual components. The connections between the SSP 14, the STP 17 and the SCP 18 are indicated by dashed lines. The dashed lines represent signaling paths between the SSP 14, the STP 17 and the SCP 18 for digital control signals. These signaling paths are not voice bearing paths, but are reserved for the control signals. Logic contained in the SCP 18 responds to digital request signals sent through the STP 17 with instructions concerning how the LEC switch 14 should respond to both incoming and outgoing calls.

The digital control signals are defined by the Common Signaling System No. 7, or SS7, which is a global standard for telecommunications defined by the International Telephone Union (ITU). The SS7 standard defines the procedures and protocol by which network elements in the PSTN exchange information over a digital signaling network to effect wireless, or cellular, and wireline call setup, routing, control and teardown. The SS7 messages are exchanged between network elements over bi-directional channels called signaling links which are also shown as dashed lines and labeled as such in FIG. 1. Thus, the SS7 signaling and protocol occurs out-of-band on dedicated channels instead of in-band on voice channels, such as the solid line labeled voice trunk in FIG. 1. The SS7 protocol provides both faster call set up times and more efficient use of the available voice circuits. Once a call has been arranged with the SS7 protocol, actual voice communication is established over voice "bearer" lines, contained in groups called voice trunks, one of which is shown in FIG. 1 with a solid line.

A second set of components are shown on the right side of FIG. 1 and represent a second SSP 20 that is contained in a second Local Exchange Carrier, or LEC, 21. The second SSP 20 is connected to another subscriber telephone 22. Also included in the right portion of FIG. 2 are a second STP 24 and a second SCP 26. The various SS7 links between the two STP's 17 and 24 and the two SCP's 18 and 26 are shown in FIG. 1 passing through the PSTN 16, as does the voice trunk line. It will be appreciated that both the SS7 control signals and the voice signal may pass through a number of conventional components within the PSTN 16 that have been omitted from FIG. 1 for simplicity. However, the SS7 components of the first local telephone company communicate with corresponding units in another local telephone company to establish a communication link between the two telephones 12 and 22 via an available voice link. While communication has been illustrated between two local telephone companies in FIG. 1, it will be appreciated that the second STP and SCP also can be included in the same local company (not shown) with communication being established without routing through the PSTN 16.

To illustrate the operation of the network 10, assume that the subscriber with the first telephone 12 desires to call the subscriber 22 with the second telephone having an out-of-switch number, that is, the second telephone 22 is not connected to the same SSP 14 as the first telephone 12. The originating SSP 14 transmits an Integrated Services digital network User Part (ISUP) Initial Address Message (IAM) to the first STP 17 to reserve an idle voice circuit from the originating SSP 14 to the destination SSP 20. The IAM includes the originating point code, the destination point code, the voice trunk identification code, dialed digits and, optionally, the calling party number. The IAM is routed over a signaling link from the first STP 17 to the destination SSP 20. The destination SSP 20 determines that it serves the called telephone 22 and that the line is available for ringing. The destination SSP 20 rings the called party line and transmits an ISUP Address complete Message (ACM) via the second STP 24 to the originating SSP 14 to indicate that the remote end of the voice trunk has been reserved. When the second subscriber picks up his telephone 22, the destination SSP 20 terminates the ringing tone and transmits an ISUP Answer Message (ANM) to the originating SSP 14 via its home STP 24. The originating SSP 14 verifies that the calling party's line is connected to the voice trunk and, if connected, initiates billing. If the calling party hangs up first, the originating SSP 14 sends an ISUP Release Message (REL) to the destination SSP 20 to release the voice trunk via associated STPs 17 and 24, respectively. If the called party hangs up first, or if the line is busy, the second SSP 20 sends a REL to the originating SSP 14, again via associated STPs 24 and 17, respectively. Upon receiving the REL from the originating SSP 14, the destination SSP 20 disconnects the voice trunk from the called party's line and sets the voice trunk to idle. The destination SSP 20 then transmits an ISUP Release Complete Message (RLC) to the originating SSP 14. When the originating SSP 14 receives the RLC, it terminates the billing cycle and sets the voice trunk to idle in preparation for the next call.

The development of the internet has further enhanced the telephonic communications with the concurrent development of a Voice-over-Internet Protocol (VoIP) Telephone companies have found that it is sometimes cheaper to carry voice traffic over Internet Protocol (IP) networks than over traditional switched circuit networks because an IP telephony network can make better use of available bandwidth. In a VoIP network, digitized voice data is highly compressed and carried in packets over IP networks, which are commonly referred to as "backbone networks". Using the same bandwidth, a VoIP network can carry many times the number of voice calls as a switched circuit network. The use of VoIP networks has been so successful that most telecommunications companies have established dedicated backbone networks to provide VoIP service to their customers.

A typical VoIP network 30 is illustrated in FIG. 2 by a simplified schematic diagram. Components shown in FIG. 2 that are similar to components shown in FIG. 1 have the same numerical identifiers. To the left of the diagram is the Local Exchange Company (LEC) 13 shown in the left portion of FIG. 1; however, in FIG. 2, the LEC is connected to an IP backbone network 32. It will be appreciated that the LEC 13 would also be connected to the Public Switched Telephone Network 16, as shown in FIG. 1; however, for simplicity, the connection to the Public Switched Telephone Network 16 is not shown in FIG. 2. As shown in FIG. 2, the subscriber has a telephone 12 connected to the SSP 14. The SSP 14 is connected through a media gateway 34 to the backbone 32. The media gateway 34 receives voice calls and compresses and packetizes the voice data. The packetized voice data is then delivered to the backbone network 32 for transmission to a destination media gateway (not shown). The destination media gateway converts the packetized voice data back to a voice format for transmission to a called party through a destination SSP (not shown). It is also possible to connect phones, such as device 12 shown in FIG. 2, directly to "soft switches" that are composed of elements similar to 34, 36 and 38 and a call control component (not shown) in lieu of connecting to a traditional SSP, as shown in FIG. 2.

As also shown in FIG. 2, the SSP 14 is connected through a corresponding STP 17 to a SCP 18. The SSP 14 is operative to generate SS7 ISUP control messages to set-up and teardown calls, as described above, while the SCP 18 replies to Transaction Capabilities Application Part (TCAP) query messages to support the exchange of call logic related data across the SS7 portion of the network. However, the STP 17 and SCP 18 are connected to a signaling gateway 36. The signaling gateway 36 converts the SS7 control messages into SS7 IP packets that are relayed through the backbone network 32 to a signaling gateway (not shown) at the destination that converts SS7 IP packets back to SS7 signals. The destination gateway is connected to a destination STP and a destination SCP (not shown) that are operative, upon receiving the SS7 control messages to complete the call, also as described above. Additionally, a media gateway controller 38 is shown in FIG. 2 that is connected to the media gateway 34 and the signaling gateway 36. The SSP 14 exchanges ISUP messages with SSP's via the signaling gateway 36 to handle the registration and management of resources, such as data paths, at the media gateway 34. The media gateway 34, signaling gateway 36 and media gateway controller 38 may be provided by the LEC 13, or the IP backbone network 32, and provide an interface between the conventional SSP 14, STP 17 and SCP 18 and the IP backbone network 32.

While the use of IP backbone networks have enabled telephone companies to increase capacity, the continuing proliferation of service requirements has steadily increased the need for more capacity. Typical native Internet Protocol (IP) service proves a "best effort" service environment since IP, by itself, does not limit requests or manage data packet flow. Thus, the resulting provided services are equally good or poor, depending upon the infrastructure investment made by the provider and the existing network loading conditions. Native IP without traffic engineering is analogous to a busy expressway without provision of traffic stop lights on expressway on-ramps to control vehicle entry onto the expressway. By controlling the rate of vehicles entering the expressway, overloading is avoided, allowing the traffic on the expressway to flow smoothly and rapidly. Without the entrance control signals, the expressway experiences best effort flow and can become overloaded with resulting traffic jams and slow downs. Such best effort flow is not desirable for high priority traffic, such as ambulances, tow trucks and police vehicles, just as best efforts are not desirable for high priority communications.

Typically, telephony service providers have elected to provide equally good service to all consumers regardless of the value they derive and the price they are willing to pay. The net result is very heavy investment by the service provider in infrastructure with all consumers benefiting equally from a high quality of service while all consumers pay in accordance with the lowest consumer value derived. However, some customers desire and/or require a higher service quality, or a lower cost. For example, medical services may desire greater availability of communication lines and/or increased bandwidth to allow consultations between remote locations, such as hospitals in different parts of the country. Providing such enhanced services in a best effort service environment would require further investment in the infrastructure to meet the demand by raising the current service level for all customers. Alternately, separate infrastructure could be added and dedicated to provide the enhanced services. Either of these approaches would be very expensive. Additionally, the first approach would not be required for all of the customers. Accordingly, it would be desirable to provide an alternate approach that would provide a higher level of service to selected customers when desired without having to increase infrastructure investment for all of the involved parties.

SUMMARY OF INVENTION

This invention relates to a method for controlling the loading of internet protocol transmission networks.

The invention contemplates providing a segmented offering of services to telephone subscribers for connection to an IP backbone network. Most industries use a similar approach to providing and costing their services. The concept perhaps can be best illustrated by the airline industry where service has traditionally been segmented in a number of classes, such as first class, business class, coach class, standby class and courtesy class. Each of the classes, while being accommodated on the same airplane and the same schedule, are priced differently, with the first choice product and times occupied by customers who derive the greatest value while contributory revenue is added by classes deriving lesser value. This allows the airline to offer premium quality of service to customers that require such premium quality of service while not having to build premium quality of service facilities for all customers merely to ensure that the few premium customers obtain their required service level.

The present invention contemplates that IP or backbone networks are segmented in a manner similar to the airline industry. Premium data customers, similar to premium level travelers, can be selected to receive the first choice of premium data transport services. Also similar to premium level travelers, premium data customers would be charged at a higher rate that reflects the premium quality of the service provided. Any additional data transport capacity can be filled on an as available basis by lower level data customers. The segmentation is implemented by providing large access paths to lower level customers and adjusting the data transmission availability by traffic shaping the lower customer's access path. In order to do this, it is necessary to first identify the occupancy, or load level, of the backbone network and then regulate the low level entry rate base upon the observed and expected occupancy conditions to provide sufficient capacity to service the premium customer needs.

The invention contemplates a method for operation of an IP backbone network in which the network customers are divided into at least two service classes with one service class having lesser demands, or deriving lesser value, than the others. The method then identifies the usage level of the lesser service class and compares that group's usage level to the available capacity of the network. If the usage level of the lesser service class adversely impacts the capability of the network to provide service to the other class, or classes, the method adjusts traffic shapers at the lesser service class access points to reduce that group's service traffic load. The result is to provide adequate network capacity and/or bandwidth to support premium service as requested by the more demanding classes of customers. When network capacity and/or bandwidth is available, the restrictions are removed from the lesser class access points.

Various objects and advantages of this invention will become apparent to those skilled in the art from the following detailed description of the preferred embodiment, when read in light of the accompanying drawings.

DETAILED DESCRIPTION

The present invention contemplates segmentation of IP data networks, or IP backbone networks, to provide a higher quality of service to customers that require such a higher service quality and are willing to pay for same. This is accomplished by providing large access paths to lower level customers and adjusting the data transmission availability by traffic shaping the lower customer's access path. In order to do this, it is necessary to first identify the occupancy, or load level, of the backbone network and then regulate the low level entry rate based upon the observed and expected occupancy conditions to provide sufficient capacity to service the premium customer needs. Accordingly, the invention contemplates that a traffic load collection system is utilized to determine the peak load conditions across the IP backbone network. The traffic load collection system then statistically determines the load contribution from low level customers that will not generate congestion on the backbone network. Traffic shaping devices that are included in the media gateway controllers, and other similar access devices, to regulate the low level customer access paths are then instructed to throttle traffic entering the backbone network to a load level that corresponds to the statistically determined level needed to avoid congestion. Strictly for VoIP, this may be accomplished by "marking" selected available "data paths" as busy in the media gateway center. The result assures adequate capacity and/or bandwidth to service the needs of higher service level customers. The higher service level customers are then charged at a higher rate that reflects the premium quality of the service being provided.

The present invention differs from current priority queuing mechanisms that generally involve marking or labeling high priority traffic. With such priority queuing mechanisms, routers within the internet sort arriving message data packets, giving designated priority packets high priority placement for outbound traffic. Unfortunately, the sorted priority traffic may still exceed the outbound transport capacity. The present invention, on the other hand, assures that there are more than adequate core network resources reserved for the priority traffic by restricting lower priority traffic message packets entering the network and utilizing capacity needed for priority message transmission.

Figure 1:
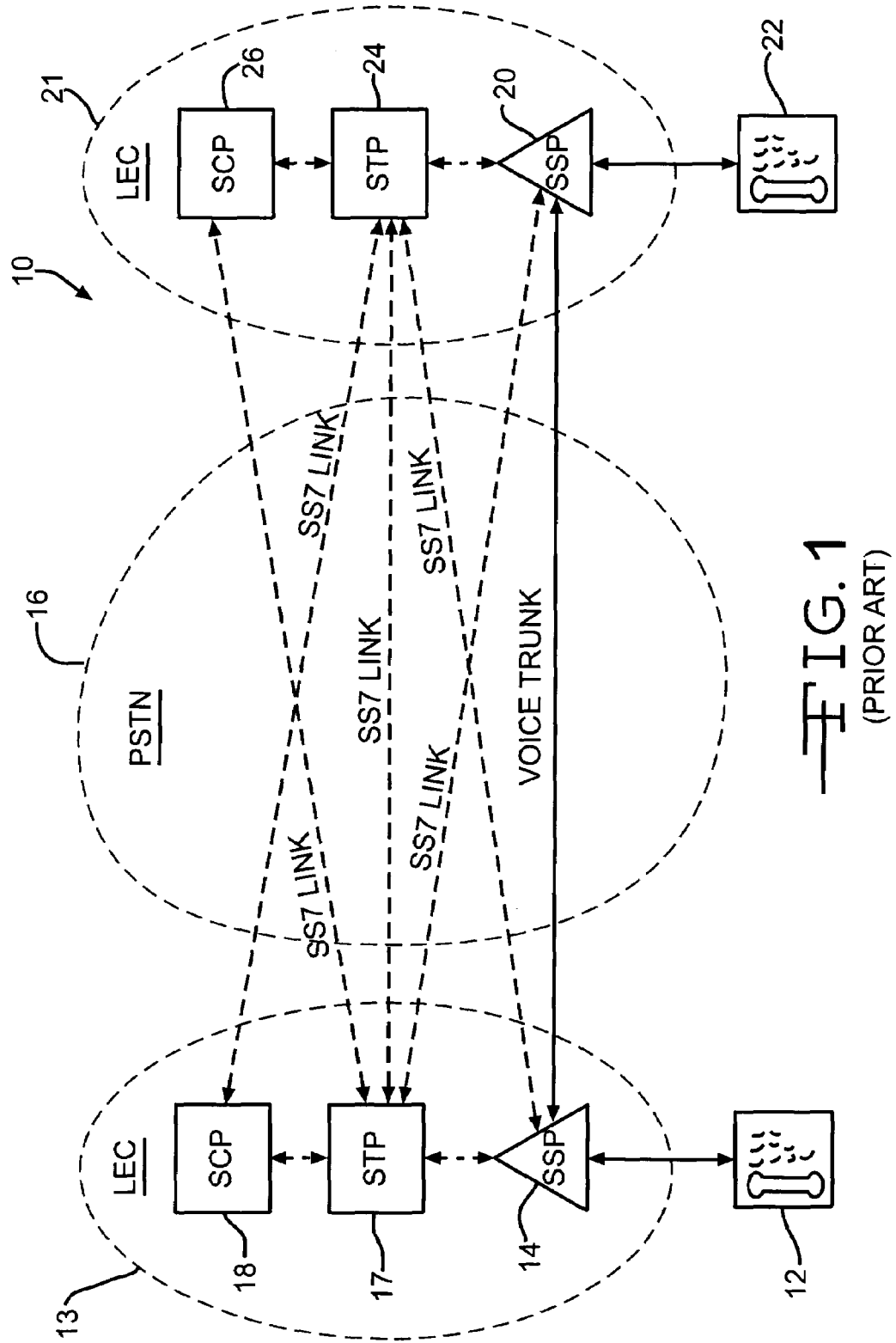
FIG. 1 is a schematic diagram of a conventional switched circuit telephone network.
Figure 2:
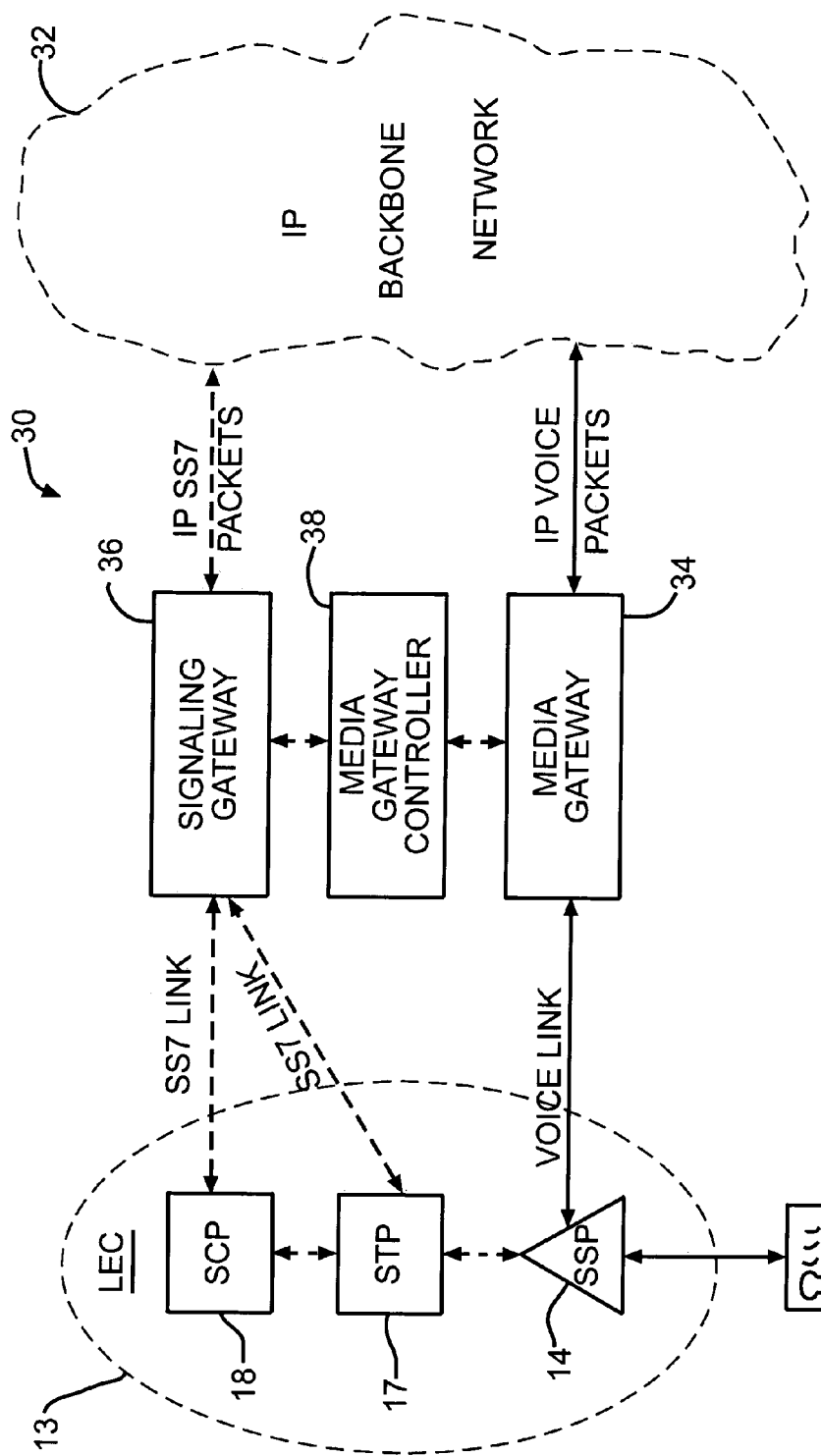
FIG. 2 is a schematic diagram of a Voice-over-Internet Protocol telephone network.
Figure 3:
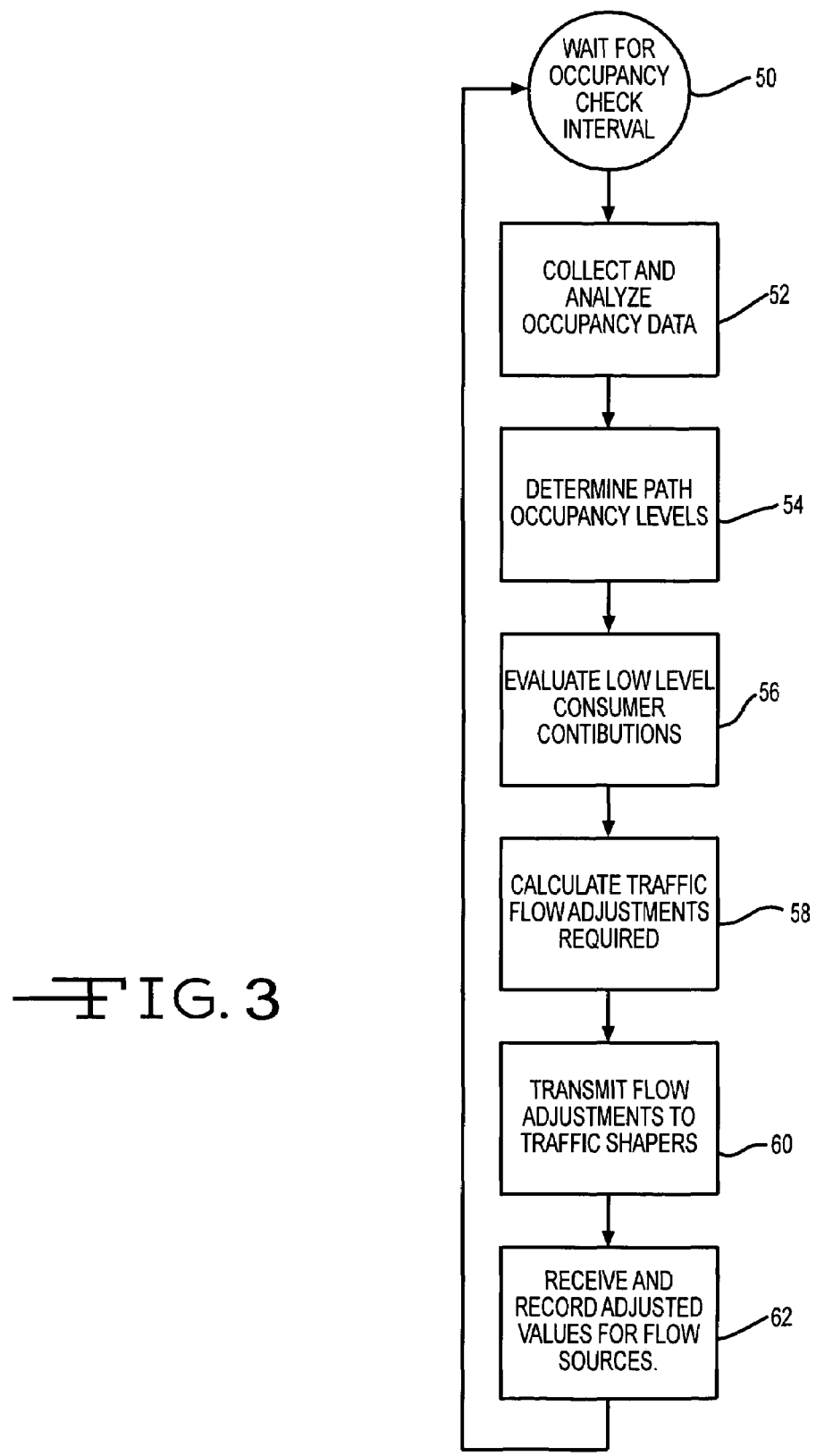
FIG. 3 is a flow chart for flow analysis and control logic for a Voice-over-Internet Protocol telephone network that is in accordance with the invention.

Referring now to FIG. 3, there is shown a flow chart that illustrates the above approach to traffic management. In the interest of simplicity, authentication and authorization scenarios have been omitted from the flow chart. Similarly, error handling and secondary analysis tool interfaces also have been omitted from FIG. 3 for simplicity. The flow chart is entered through block 50 where the traffic management system is waiting for an occupancy check interval to elapse. The invention contemplates that the traffic management system runs continuously with the logic illustrated by the flow chart being accessed at periodic intervals. In the preferred embodiment, the duration of the intervals would be variable, with the interval duration being reduced during high traffic periods, such as during normal business hours, and being increased during low traffic periods, such as during nights and over weekends. Additionally, premium service and low level service customer access paths are identified for the backbone network being utilized.

Upon the time interval ending, the management system advances to functional block 52 where occupancy data for the backbone links are collected and analyzed. The occupancy data is utilized to determine path occupancy levels in functional block 54. Next the amount of occupancy being used by low level consumer contributions is statistically determined in functional block 56. The low level consumer occupancy is subtracted from the available backbone network capacity in functional block 58. The difference between the low level customer occupancy and the available backbone network capacity is compared to the capacity required to provide service to premium service customers.

If the management system determines that there is insufficient capacity to transmit the messages being generated by the premium service customers, flow adjustments are sent to traffic shapers in functional block 60 to reduce the low level customer traffic at their access points to the backbone network. In the preferred embodiment, a subroutine that is described below, is used to implement any needed flow adjustment. The traffic shapers (not shown) may be located at the media gateway controllers or at the access ports to the backbone network. Typically, traffic shapers operate by reducing the bandwidth available to the customer. As the bandwidth is reduced, the speed of transmission slows, so that the effect of the traffic shaping is to slow the transmission for the low level customer, which is of primary interest when the backbone network is shared between VoIP and other services. The management system then advances to functional block 62, where the adjusted values for the access points to the backbone network are received and recorded for use during the next iteration of the system. The system then returns to block 50 and awaits the next iteration.

The invention also contemplates an alternate embodiment that manages occupancy of the backbone network at a source address/destination address pair level. This approach utilizes a conventional backbone network load management tool, such as, for example, Zvolve's Conscious™ tool. In the alternate embodiment, which also is illustrated by the flow chart shown in FIG. 3, the load management tool would be used in functional blocks 52 and 54 to analyze demand paths and determine occupancy levels for given available data transmission paths in the backbone network. The path occupancy levels would then be compared to allowed occupancy levels for a given consumer pricing level in functional block 56 and any needed traffic flow adjustments would be determined in functional block 58. In functional block 60, the analysis system would then send control signals to traffic shapers regulating all low level consumers contributing traffic to demand paths that are, or are projected to be, above the allowed occupancy levels for that consumer level. The control signals would shape the traffic by reducing or blocking traffic from the consumer source point of access. Details of the subroutine used to implement the traffic flow adjustments are given below. The alternate embodiment then advances to functional block 62, where the adjusted values for the access points to the backbone network are received and recorded for use during the next iteration of the system, and then returns to block 50 and awaits the next iteration.

Figure 4:
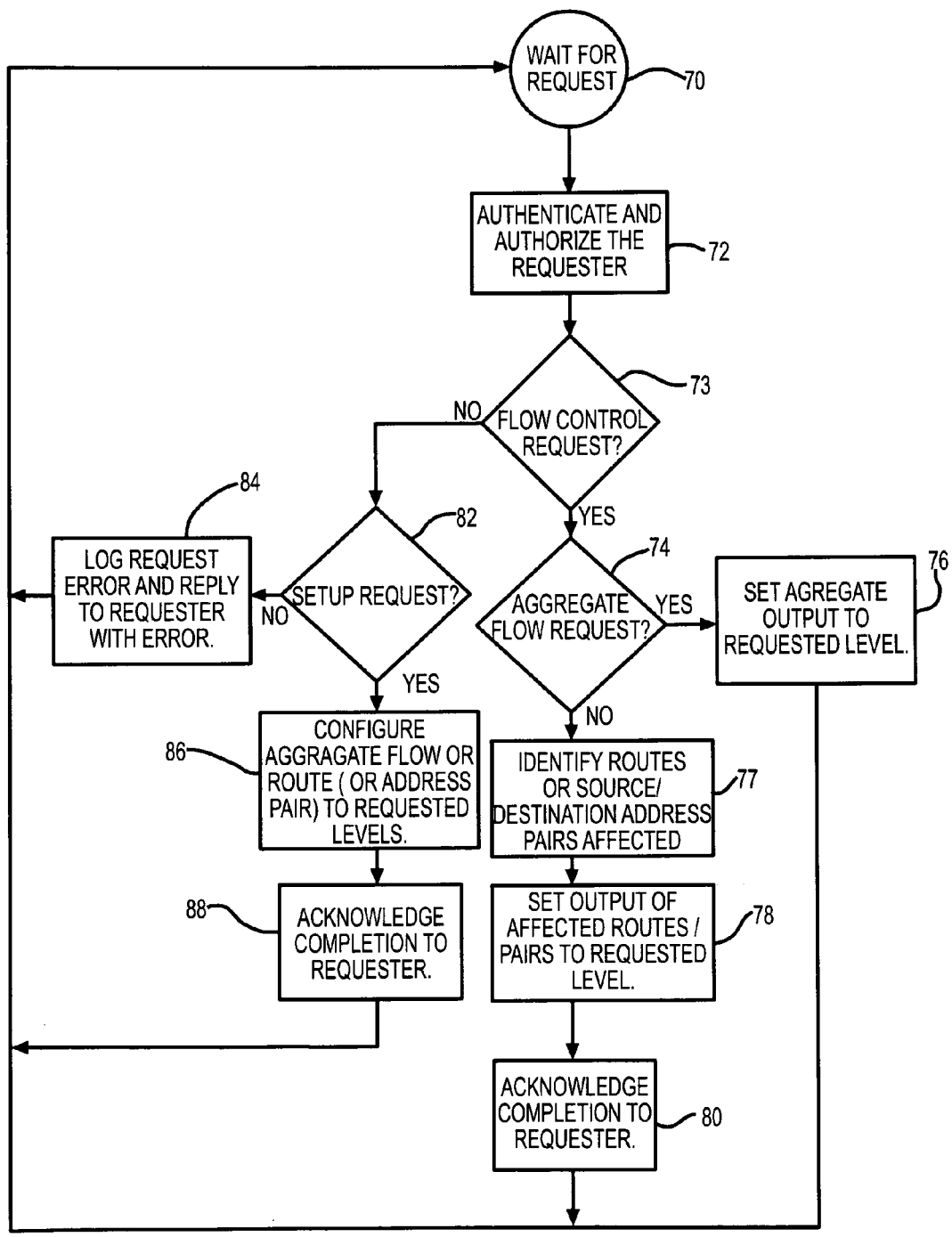
FIG. 4 is a flow chart for a traffic shaper control interface logic for the control logic shown in FIG. 3.

Referring now to FIG. 4, there is shown a flow chart that illustrates a subroutine for implementing the flow adjustment shown in functional block 60 in FIG. 3. The subroutine is applicable to both of the embodiments of the invention that are described above. The subroutine is entered through block 70 in which the algorithm is awaiting a request to adjust the traffic flow of IP packets over a backbone network. Upon receipt or a transmission request, the subroutine advances to functional block 72 where the request is authenticated and the requestor authorized. The authentication occurring at this point is necessary to assure that the requestor is an authorized network management system or operator rather than a hacker. Accordingly, marking, labeling or distinguishing of premium and best effort customers must occur before reaching the traffic shaper or media gateway. With respect to traffic shapers, the invention contemplates that the network address or packet labels are appropriately configured while with respect to media gateways, the incoming circuit that is to be translated is appropriately configured. For simplicity, authentication and authorization failure scenarios are not shown in FIG. 4. The subroutine then advances to decision block 73.

In decision block 73, the subroutine determines whether the request is a flow control request. If the answer is affirmative, the subroutine transfers to decision block 74 where the subroutine determines if the request is an aggregate request, as generated by the first embodiment of the invention, or a request to regulate the backbone network at the address level, as generated by the alternate embodiment of the invention. If the subroutine determines that an aggregate request is present, the subroutine transfers to functional block 76 where the aggregate level of the traffic shapers is set. The subroutine then returns to block 70 to await the next request.

If, in decision block 74, the subroutine determines that the request requires regulation of the backbone network at the source address/destination address pair level, the subroutine transfers to the functional block 77 where the specific routes or source address/destination address pairs are identified. The subroutine then advances to functional block 78 where the outputs of the selected routes or source address/destination address pairs are set to the requested level to control the access of low level customers thereto. The subroutine advances to functional block 80 where the setting of the levels is acknowledged to the requester. The subroutine then returns to block 70 to await the next request.

Returning to decision block 73, if it is determined that the request does not include a flow control request, which is indicative that load levels are adequate for the backbone network to handle the traffic being generated by all of the classes of customers, the subroutine transfers to decision block 82. In decision block 82, the subroutine determines if the request is for setting up an IP packet transmission. The absence of such a request is an indicator of an error and the subroutine transfers to functional block 84 where an error is logged and an error message sent in reply to the requestor. The subroutine then returns to block 70 to await the next request.

If, in decision block 82, the subroutine determines that the request does include an IP packet transmission set up request, the subroutine transfers to decision block 86 where the aggregate flow route or address pair is configured to the requested level. The subroutine then advances to functional block 88 where the completion of the configuration is acknowledged to the requester. The subroutine then returns to block 70 to await the next request.

The invention also contemplates that, upon the demand for premium service decreasing, capacity of the backbone network that was shifted to serve the premium customers would be made available to lower level customers by reducing or entirely removing traffic shaper restrictions at their access points. Since the logic shown in FIGS. 3 and 4 are being continuously iterated, such adjustments would automatically occur.

The inventors expect that the invention will provide a mechanism for leveling backbone network traffic while also reducing and/or removing backbone congestion points. Additionally, the inventors expect that the invention will drive the backbone network infrastructure to offer an on-demand higher quality of service based backbone network transport for customers willing to pay a premium service price. Also the inventors believe that the invention will provide a mechanism for discounted high quality backbone network transport for lower paying customers when premium use is not required.

While the preferred embodiment has been illustrated and described as providing a premium service for customers willing to pay a premium service price, the invention also contemplates providing a predictive degradation level of service. Such service would allow data loss during transmission for customers at a discounted cost. By accepting data loss, the bandwidth requirement for the degraded message is reduced, freeing capacity for other users or additional degraded messages. The invention further contemplates that the data loss would be evenly distributed over the data packets. Because the data loss is predicable and evenly distributed, the analog content of the messages can be very effectively reconstructed.

Additionally, while the preferred embodiment has been illustrated and described in terms of voice networking, it will be appreciated that the invention also may be practiced upon any communications network having specific sessions that require higher quality and reliability. Some examples of such networks include video conferencing and interactive communications, such as gaming or equipment control.

The principle and mode of operation of this invention have been explained and illustrated in its preferred embodiment. However, it must be understood that this invention may be practiced otherwise than as specifically explained and illustrated without departing from its spirit or scope. For example, while the preferred embodiments have been illustrated an explained in terms of two classes of service, it is also possible to practice the invention with more than two classes of service. Any intermediate levels of service would be accommodated after the premium service is provided and before restrictions are removed from the lowest class of service.

What is claimed is:

1. A method for controlling service access to a backbone network comprising the steps of:
   (a) providing an internet protocol backbone network having a plurality of access points that include traffic control devices, and further providing at least two service classes for the internet protocol backbone network, the service classes distinguished by a level of service, the service classes including at least one lower class that has a lesser demand for a level of service than the other class;

(b) allowing the users of the network provided in step (a) to select one of the service classes, and further dividing the users into the selected service classes;

(c) identifying the usage level of the lower service class;

(d) identifying the usage level of the other class (e) comparing the usage level of the lower service class identified in step (c) to the capacity of the backbone network required to provide service to the other class; and (f) adjusting the traffic control devices at the access points to the backbone network to decrease access of the lower service class to the backbone network to provide sufficient capacity in the network for transport of messages for the other class, the decrease in access occurring only when there is insufficient capacity in the network for transport of messages for the other class.

2. The method according to claim 1 wherein the identification of the usage levels in steps (c) and (d) includes include aggregation of the message flow over the backbone network.

3. The method according to claim 1 wherein the identification of the usage levels in steps (c) and (d) are determined by examination of the traffic level connecting the origination address range to the destination address range for the message flow over the backbone network.

4. The method according to claim 1 wherein the identification of the usage levels in steps (c) and (d) are determined by examination of the backbone network links connecting the origination addresses to the destination addresses for the message flow over the backbone network.

5. The method according to claim 4 wherein the usage level in step (c) is determined by (c1) collecting and analyzing the occupancy data of the backbone links to determine path occupancy levels by class of service; and (c2) determining the amount of occupancy being utilized by the lesser service class.

6. The method according to claim 5 wherein the amount of occupancy being used by the lesser service class is statistically determined in step (c2).

7. The method according to claim 5 wherein in step (f) the traffic control devices are adjusted to increase the access to the backbone internet for the lower service class when there is sufficient capacity in the network for transport of messages for the other class.

8. The method according to claim 5 wherein the usage level in step (d) is determined by (d1) collecting and analyzing the occupancy data of the backbone links to determine path occupancy levels by class of service; and (d2) determining the amount of occupancy being utilized by the lesser service class.

9. The method according to claim 8 wherein the comparison of usage levels in step (e) is determined by (e1) subtracting the amount of occupancy being utilized by the lesser service class as determined in step (c) from the available backbone network capacity; and (e2) comparing the resulting difference from step (e1) to the capacity required to provide service to the other classes of service as determined in step (d).

10. The method according to claim 1 wherein a backbone network tool is utilized in steps (c) and (d) to identify the usage level.

11. The method according to claim 1 wherein the lesser service class is assigned a billing rate that is less than the billing rates for the other service classes.

12. The method according to claim 1 wherein the lesser service class includes messages that have been selectively degraded.

13. The method according to claim 12 wherein the lesser service class is assigned a billing rate that is less than the billing rates for the other service classes.

14. The method according to claim 1 wherein the traffic control devices include at least one traffic shaper.

15. The method according to claim 14 further including identification of the messages belonging to other classes before entry into the traffic shaper.

16. The method according to claim 1 wherein the traffic control devices include at least one media gateway.

17. The method according to claim 16 further including identification of the messages belonging to other classes before entry into the media gateway.

* * * * *